United States Patent [19]

Ainsworth et al.

[11] Patent Number: 5,532,575
[45] Date of Patent: Jul. 2, 1996

[54] MULTILEVEL CONVERTER WITH CAPACITOR VOLTAGE BALANCING

[75] Inventors: John D. Ainsworth; David R. Trainer, both of Stafford, United Kingdom

[73] Assignee: GEC Alsthom Limited, United Kingdom

[21] Appl. No.: 369,474

[22] Filed: Jan. 6, 1995

[30] Foreign Application Priority Data

Jan. 8, 1994 [GB] United Kingdom ................... 9400285

[51] Int. Cl.⁶ .................................................. H02M 1/12
[52] U.S. Cl. .............................. 323/211; 363/40; 363/44
[58] Field of Search ................................ 363/39, 40, 44, 363/79–82; 323/209–211

[56] References Cited

U.S. PATENT DOCUMENTS 5,345,375  9/1994  Mohan ..................................... 363/40

FOREIGN PATENT DOCUMENTS 2142484  1/1985  United Kingdom.

*Primary Examiner*—Peter S. Wong
*Assistant Examiner*—Aditya Krishnan
*Attorney, Agent, or Firm*—Kirschstein Ottinger Israel and Schiffmiller

[57] ABSTRACT

A multilevel convertor having a set of series-connected capacitors and a set of associated series-connected switching elements employs a main control loop which controls some aspect of an AC system, e.g. busbar voltage, by controlling the switching times of the switching elements. The convertor also comprises one or more subsidiary control loops for establishing a desired relationship between mean DC voltage levels on the capacitors. The subsidiary control loops combine first signals proportional to DC voltage levels on the capacitors and second signals proportional to tap currents associated with the capacitor nodes to provide signals which modulate the timing of the switching of switching elements connected to those capacitors which are out of balance, while leaving alone the timing of the switching of switching elements associated with those capacitors which have the required voltage across them. The advantage of the invention is that it prevents the "run-away" of individual capacitor voltages to values grossly in error, the run-away being due either to spontaneous instability or to temporary disturbances.

22 Claims, 6 Drawing Sheets

MULTILEVEL CONVERTER WITH CAPACITOR VOLTAGE BALANCING

BACKGROUND OF THE INVENTION

The invention concerns a multilevel convertor for connection to an AC system, and in particular, but not exclusively, a multilevel convertor for use as a static VAr (volt-amp reactive) compensator.

Multilevel convertors are known for fulfilling various functions, one function being the drawing of adjustable lagging or leading reactive power from an AC system to which they are connected. The aim in such an process may be to stabilise some parameter of AC system operation, such as, for example, the level of AC voltage existing on the AC system. One type of multilevel convertor is shown in FIG. 1. In FIG. 1, a multilevel convertor 10, which is applied for use as a static VAr compensator (SVC), consists of a set of capacitors 20 connected in series, and a likewise series-connected set of switching devices 30, which are assumed to be, typically, gate-turn-off thyristors (GTO's). The set of GTO's 30 is connected in parallel with the set of capacitors 20, the tapping points of the GTO's being connected via a set of diodes 40 to respective tapping points of the set of capacitors 20. The convertor 10 is connected to a three-phase AC system 50 through a three-phase transformer 48. The AC system is represented in simplified form as a three-phase Thevenin-equivalent source generator 51 and impedance 52 feeding three-phase busbars 53. To accommodate the three phases, the set of GTO's 30 are triplicated at 30' and 30", the tapping points of these latter two sets being taken by way of diode sets 40' and 40" (not shown) to the respective tapping points of the set of capacitors 20. Thus, the same set of capacitors is shared by all three phases.

A control system 60, which in normal operation is synchronised with the AC system frequency, sets up the required drive signals for the GTO sets 30, 30' and 30" on lines 61. In operation, the control system 60 switches groups of GTO's 30, 30', 30" on and off in a given sequence, so as to connect each transformer secondary terminal to the nodes D to H of the set of capacitors 20 in turn. It is assumed to begin with that the capacitors 21–24 are all charged to a certain DC voltage level. Thus, when the GTO's are switched in the correct sequence, a pseudo-sinusoidal voltage whose waveform consists of a number of steps, in this case five, is imposed on the AC system 50 via the transformer 48. The control system 60 is arranged so that, in normal operation, the multilevel voltage appearing on each of nodes A, B and C for the three phases is in phase with the AC system voltage, the amplitude of the multilevel voltage being a function of the amount of DC charge on the capacitors 20. Since, now, the transformer linking the convertor 10 and the AC system 50 appears as a leakage inductance connected between them, the currents $i_A$, $i_B$ and $i_C$ will be reactive current and the convertor will appear either as a leading (capacitive) reactive power source or as a lagging (inductive) reactive power source to the AC system, depending on whether the multilevel voltage on nodes A, B and C has a higher or lower amplitude than the AC system voltage on the busbars 53. This may be used to increase or decrease, respectively, the voltage level of the AC system busbars 53, or alternatively maintain this voltage constant by compensating for the effects of real and reactive current changes in loads (not shown) connected to the busbars.

Waveforms for the various voltages and currents in the multilevel circuit are shown in FIG. 2. The period of the AC system voltage, which is assumed to be sinusoidal, is divided into eight segments for the five-level convertor illustrated in FIG. 1. The GTO's are arranged by the control system 60 to conduct at the times $t_1$-$t_2$, $t_2$-$t_3$, etc, so that at each successive time segment successive nodes D-H of the set of capacitors 20 are coupled to node A, in the case of the first phase, and to nodes B and C in the case of the second and third phases, respectively. The switching sequence is shown in Table 1 below:

| Time | References of GTO's nominally conducting | Phase A voltage (connection reference) |
|---|---|---|
| $t_1$-$t_2$ | 33, 34, 35, 36 | F |
| $t_2$-$t_3$ | 32, 33, 34, 35 | E |
| $t_3$-$t_4$ | 31, 32, 33, 34 | D |
| $t_4$-$t_5$ | 32, 33, 34, 35 | E |
| $t_5$-$t_6$ | 33, 34, 35, 36 | F |
| $t_6$-$t_7$ | 34, 35, 36, 37 | G |
| $t_7$-$t_8$ | 35, 36, 37, 38 | H |
| $t_8$-$t_9$ | 34, 35, 36, 37 | G |

This sequence recurs for each successive cycle of the AC system voltage, and assumes operation under either steady-state conditions, e.g. a constant busbar voltage, or in changing conditions.

The current in any conducting GTO 31-38 or diode 31A-38A or 41-46 at any instant is the AC phase current $i_A$, which may be positive or negative, depending on the operating conditions of the SVC. Thus, taking time interval $t_1$-$t_2$ as an example, if phase current $i_A$ is positive (i.e. in the direction of the arrow shown in FIG. 1) its current path will be GTO's 35 and 36 and diode 44. If it is negative, its path will be diode 43 and GTO's 33 and 34. In either case, the phase voltage $v_A$ will be substantially the voltage on node F, as given in the above Table, neglecting the small voltage drops in the conducting GTO's or diodes. For other time periods, the phase voltage will be similarly clamped to node E, D, G or H. The waveform $v_A$ in FIG. 2 is shown taken with respect to node F, which may be a purely fictitious neutral connection.

The waveform $v_A$ can be seen to have five voltage levels corresponding to the five nodes in the set of capacitors 20, i.e. the convertor of FIG. 1 is said to be a "five-level" convertor. The stepped waveform will normally be arranged to be a reasonably close approximation to a sine wave in order to minimise the imposition of harmonics onto the AC system. The resulting phase current $i_A$ is therefore assumed to be substantially sinusoidal, as illustrated in FIG. 2, and is a function of the difference between the AC busbar voltage (not shown), the phase voltage $v_A$ and the leakage reactance of the transformer 48.

The same basic operation obtains also for the other two phases, B and C, so that similar phase-current and phase-voltage waveforms occur for these phases also, but separated from the phase A waveforms by 120° and 240° electrical, respectively.

The various voltages and currents pertaining to the set of capacitors 20 are shown in FIG. 3. The currents are divided into, firstly, capacitor "tap currents", $i_D$-$i_H$, which represent the currents flowing into or out of the tapping points (nodes) of the capacitor set 20, and secondly, the series currents, $i_{21}$-$i_{24}$, which represent the currents through each capacitor 21-24 in turn. The DC potentials already existing on the capacitors 21-24 are shown as $V_{21}$-$V_{24}$, respectively. The action of the GTO switching is shown carried out by an equivalent multi-way switch 39, the phase voltage being considered as the voltage that exists between the common terminal of the switch 39 ("A") and the mid-point "neutral" (N) of the set of capacitors.

The waveforms of the capacitor "tap" currents and series currents are shown in FIG. 2, under $i_D$-$i_F$ and $i_{21}$-$i_{24}$, respectively. Current $i_D$ is the tap current flowing into node D during time period $t_3$-$t_4$, $i_E$ is the tap current flowing into node E during time periods $t_2$-$t_3$ and $t_4$-$t_5$, and so on. The series current $i_{21}$ is the same as the tap current $i_D$, series current $i_{22}$ equals tap currents $i_D$+$i_E$, and so on. The mean voltage across each capacitor is the DC voltage that is imposed on the capacitors at the start of operation, this being effected, for example, by arranging for the control system 60 to switch the GTO's such that the capacitors charge up to an initial DC value from the AC system when the SVC is first switched on. Since there can be no mean current flowing through a capacitor in steady state, only "displacement" current, the waveforms $i_D$ -$i_H$ and $i_{21}$-$i_{24}$ are shown as having zero mean current. The capacitor voltages $V_{21}$-$V_{24}$ will, of course, not be totally invariant even under steady-state conditions, since they will have the currents $i_{21}$-$i_{24}$ flowing through them, but the average voltage across each capacitor will be that to which it is initially charged.

Assuming now that the SVC is arranged to hold, say, the voltage of the AC system substantially constant, the control system 60 will react to any change in that voltage by causing the rate at which the GTO's are switched to be either accelerated or retarded, depending on whether the AC system voltage has decreased or increased. Such a change in the rate of switching has the effect of moving the phase voltage $v_A$ (and $v_B$ and $v_C$) out of phase with the AC system voltage and creating a real component in the corresponding phase current. This real component causes a temporary flow of real power into or out of, as the case may be, the convertor, which causes a corresponding increase or decrease in the mean DC charge on the capacitors. This, in turn, increases or decreases the phase voltage accordingly, thereby compensating for the original disturbance in the AC system voltage. Thereafter, phase voltage returns to an in-phase relationship with the AC system voltage. Thus, it can be seen that the synchronism that normally exists between phase voltage and AC system voltage is momentarily disturbed when a change in the latter occurs, in order to correct for this change, but is restored immediately correction has been effected.

In practice, the kind of multilevel convertor arrangement described above has been found to have a drawback, namely a form of internal instability in which the relative DC voltages on the capacitors deviate to assume steady-state values grossly in error from the ideal "designed" values. Such gross errors may occur spontaneously, or due to large transients, for example during recovery after temporary AC system short-circuits. The result is that the phase voltages $v_A$, $v_B$ and $v_C$ are distorted, together with the corresponding phase currents, and excessive harmonic distortion is caused in the AC system. Further, since the peak voltages across the GTO's and diodes are dependent on the voltages on the capacitors, these semiconductor devices (and also the capacitors themselves) may be subjected to excess voltages, resulting in device failure.

It would be desirable to provide a multilevel convertor which mitigates the disadvantages associated with the known multilevel convertor arrangements.

SUMMARY OF THE INVENTION

In accordance with a first aspect of the invention, there is provided a multilevel convertor for connection to an AC system, comprising a plurality of series-connected capacitors, the capacitors being arranged to be charged to an initial DC voltage, a switching arrangement for coupling each node of the plurality of capacitors in turn onto the AC system through an inductance means, and a control means comprising a main control loop arrangement for controlling the timing of the coupling of each node of the plurality of capacitors in turn onto the AC system and a subsidiary control loop arrangement for establishing a predetermined relationship between the mean DC voltage levels on the plurality of capacitors, the subsidiary control loop arrangement being arranged to combine first signals proportional to the mean DC voltage levels on the capacitors and second signals proportional to tap currents entering the nodes of the plurality of capacitors, and to modulate the timing of the coupling of the capacitor nodes to the AC system by way of the main control loop arrangement in dependence on the result of the combination of the first and second signals such as to establish the predetermined capacitor voltage relationship.

The advantage of using a subsidiary control loop arrangement is that, where the voltages on the individual capacitors "run away" from their intended values, often to assume gross errors in this respect, for example due to the momentary imposition of a short-circuit on the AC system, such a control arrangement can restore the correct value of voltage to the capacitors concerned, while leaving unaffected the already correct values on the other capacitors.

The subsidiary control loop arrangement may comprise a plurality of subsidiary control loops, each subsidiary control loop comprising a first combining means having a first input for receiving a first signal proportional to the difference between a mean DC voltage level on a respective capacitor and a further DC voltage level and a second input for receiving a second signal proportional to a tap current entering a node associated with the respective capacitor.

The first combining means may be a first multiplier and the subsidiary control loop may comprise a difference means having a first input for receiving the mean DC voltage level on the respective capacitor and a second input for receiving the further DC voltage level, an output of the difference means being connected to the first input of the first multiplier.

The second input of the difference means may be arranged to receive a further DC voltage level which is a reference voltage level, the subsidiary control loop being thereby arranged to establish a predetermined absolute reference mean DC voltage level on the respective capacitor. Alternatively, the second input of the difference means may be arranged to receive a further DC voltage level which is proportional to a mean DC voltage level on another capacitor, said respective capacitor and said other capacitor forming a respective pair of capacitors, the second input of the first multiplier being arranged to receive a second signal proportional to tap currents entering nodes associated with said respective pair of capacitors, the subsidiary control loop being thereby arranged to establish a predetermined relationship between the mean DC voltages on said respective pair of capacitors. As a third alternative, the second input of the difference means may be arranged to receive a further DC voltage level which is proportional to the average of the voltage levels on all the capacitors.

The subsidiary control loop may comprise a second combining means having an output connected to the second input of the first multiplier and first and second inputs for receiving first and second signals proportional to tap currents entering respective nodes associated with said respective pair of capacitors.

The subsidiary control loop may comprise a weighting means in one or both of the first and second inputs of the second combining means. The second combining means and the weighting means may be configured such that, when the convertor is in operation, a signal at the output of the second combining means consists of the difference between one of the first and second signals proportional to tap currents and substantially twice the other.

Said second signals proportional to tap currents may be derived by way of a sensing means for sensing current flowing in the inductance means, the subsidiary control loops comprising respective strobing means for enabling the current sensed in the sensing means to be passed on to subsequent circuitry as the second signal proportional to the capacitor tap currents at those times when the current flowing through the inductance means corresponds to the capacitor tap currents associated with the respective capacitor or pair of capacitors. The sensing means may be a current transformer.

The control means may comprise a third combining means, a voltage-controlled oscillator fed from an output of the third combining means, and a sequencing means fed from an output of the voltage-controlled oscillator and controlling the switching arrangement, the third combining means having a first input for receiving a signal representative of a parameter to be controlled, a second input for receiving a reference signal representative of a desired value of the parameter to be controlled, and a third input for receiving a signal for establishing the predetermined relationship between the mean DC voltage levels on the plurality of capacitors.

The control means may include an adder for summing the outputs of the first combining means in the various subsidiary control loops, an output of the adder being connected to the third input of the third combining means.

The sequencing means may include a binary counter having a clocking input fed from the output of the voltage-controlled oscillator and a plurality of binary outputs, and a read-only memory having a plurality of address inputs fed from respective binary outputs of the counter, a plurality of storage locations and a plurality of data outputs which are arranged to switch the switching arrangement according to a pattern of data stored in the addressed storage locations.

The switching arrangement may include a plurality of series-connected first switching means and a like plurality of series-connected second switching means, the plurality of first switching means being connected in series with the plurality of second switching means across the outermost nodes of the plurality of capacitors, and a plurality of first diodes and a like plurality of second diodes, the plurality of first switching means having tapping points which are connected by means of respective first diodes to respective tapping points of the plurality of capacitors and the plurality of second switching means having tapping points which are connected by means of respective second diodes to the same respective tapping points of the plurality of capacitors, the second diodes being configured in a reverse direction to the first diodes, and the inductance means being constituted by the leakage reactance of a voltage transformer arranged to link the convertor with the AC system.

The number of capacitors may be n, the number of first and second switching means may be 2n, the number of first and second diodes may be n−1 and the number of voltage levels in the voltage presented to the AC system may be n+1.

The transformer may be a single-phase transformer, n may be an even number, and a secondary winding of the transformer may be connected at one end to the junction of the pluralities of first and second switching means and at the other end to the centre tap of the plurality of capacitors.

Alternatively, the transformer may be a single-phase transformer and the convertor may include a plurality of third switching means and a like plurality of fourth switching means, the third and fourth switching means being configured in the same way as the first and second switching means and being connected to the same respective capacitor tapping points by way of respective pluralities of third and fourth diodes, a secondary winding of the transformer being connected at one end to the junction of the pluralities of first and second switching means and at the other end to the junction of the pluralities of third and fourth switching means, the sequencing means being arranged to switch the third and fourth switching means in antiphase with the first and second switching means.

As a further alternative, the transformer may be a three-phase transformer and the convertor may include a plurality of third switching means and like pluralities of fourth, fifth and sixth switching means, the third and fourth switching means and the fifth and sixth switching means being configured in the same way as the first and second switching means and being connected to the same respective capacitor tapping points by way of respective pluralities of third, fourth, fifth and sixth diodes, the transformer having first, second and third secondary phase windings which are connected to the junction of the pluralities of first and second switching means, the junction of the pluralities of third and fourth and the junction of the pluralities of fifth and sixth switching means, respectively, the control means being triplicated in order independently to control the switching of the first and second, the third and fourth, and the fifth and sixth switching means.

The first, second and third secondary phase windings may be configured in star or in delta, the line voltage terminals of the star or delta configuration being connected to respective junctions of the pluralities of first and second switching means, the pluralities of third and fourth switching means and the pluralities of fifth and sixth switching means.

The switching means may be gate-turn-off thyristors (GTOs), or they may be bipolar transistors, field-effect transistors, MOS-controlled thyristors or insulated-gate bipolar transistors. Where the application is a high-voltage application, GTOs will generally be found to be the most suitable.

The control means may be arranged to control the AC system voltage, the current passing through the inductance means, or the admittance of the multilevel convertor as seen from the AC system.

In accordance with a second aspect of the invention, there is provided a static VAr compensator comprising a multilevel convertor as defined above, the convertor being arranged to draw adjustable leading or lagging reactive power from the AC system.

In accordance with a third aspect of the invention, there is provided an AC—AC coupling arrangement comprising two multilevel convertors as defined above, the convertors being connected back-to-back so that they share a common set of capacitors. The convertors may be connected to different AC systems so as to transfer power between these systems, or they may be connected to the same AC system, one converter being coupled in shunt to the system while the other is coupled in series with the system and a load. The latter arrangement constitutes an autotransformer.

According to a fourth aspect of the invention, there is provided a multilevel convertor arrangement comprising a plurality of multilevel convertors as defined above, in which the multilevel convertors are configured in parallel for connection to an AC system, the respective switching means of the convertors being arranged to be switched at different times so as to provide the equivalent of a single multilevel convertor having a number of levels approximately equal to the sum of the levels of each individual convertor.

BRIEF DESCRIPTION OF THE DRAWINGS

The invention will now be described, by way of example only, with reference to the drawings, of which.

DETAILED DESCRIPTION OF THE INVENTION

Figure 4:
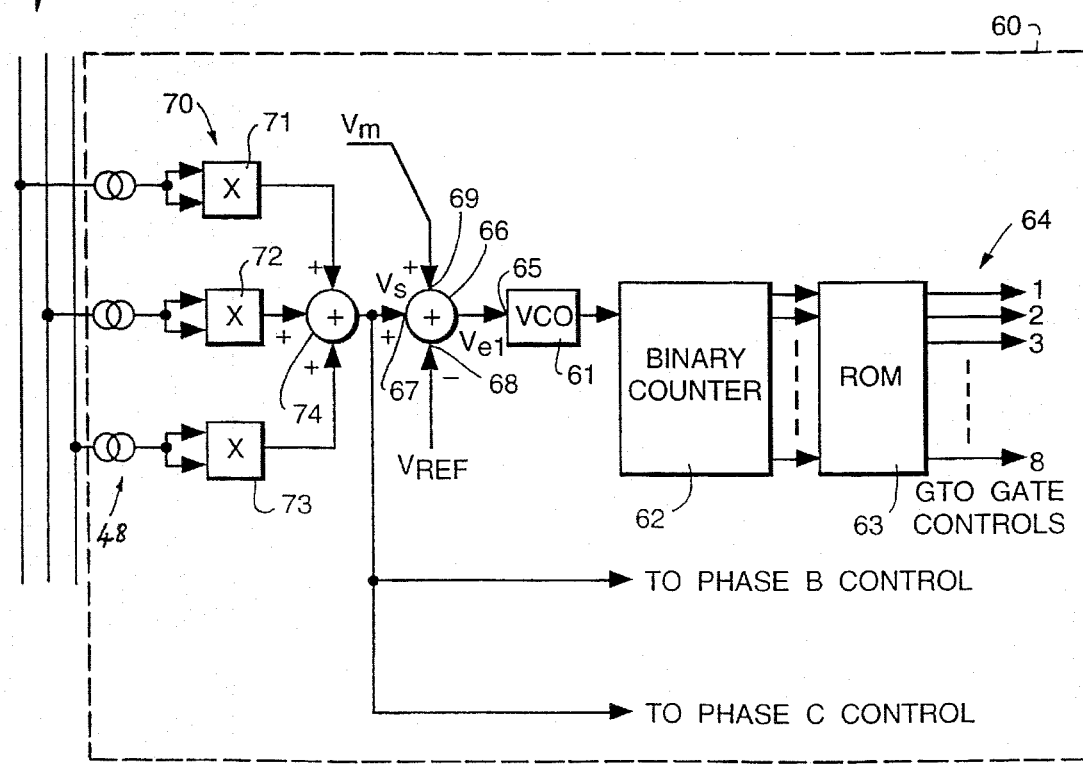
FIG. 4 is a schematic diagram of an embodiment of the control system for a multilevel convertor according to the invention.

Referring to FIG. 4, an embodiment of the control system 60 in a multilevel convertor according to the invention is shown, in which means are provided for stabilising the voltage appearing on one of the AC system busbars 53. It is to be understood that similar control circuits exist for the other phases also. All three control circuits for the three phases operate in conjunction with the basic multilevel convertor arrangement of FIG. 1. In FIG. 4, a voltage-controlled oscillator (VCO) 61 is provided which feeds a binary counter 62. The binary counter 62 feeds in turn the address inputs of a read-only memory (ROM) 63, the data outputs 64 of which are taken to the gates of GTO thyristors 30 employed in the main circuit of the convertor (see FIG. 1). The VCO 61 is arranged to operate at a high frequency relative to the frequency of the AC system 50, and, by clocking the counter 62 through its various binary states, forces various logic states per clocking period onto the ROM data outputs 64 to switch the GTO's in a given sequence. The sequence is stored in the memory locations of ROM 63 and corresponds to that shown in Table 1. Under normal operating conditions, i.e. a constant AC system voltage, the frequency of the VCO 61 will be a multiple of the AC system frequency, which may be, for example, 50 Hz.

The VCO 61 reacts to the value of an error voltage on its input 65, and this error voltage is the difference between the AC system voltage and a reference voltage. The difference is formed by means of a first combining means 66, to two inputs 67, 68 of which are taken, respectively, a signal $V_S$ representing the AC system voltage and a reference voltage $V_{REF}$, and from whose output is taken the error voltage $V_{e1}$. A further input 69 receives a signal $V_m$, which will be discussed later.

The signal representing the AC system voltage is formed by a sum-of-squares arrangement 70 consisting of three multipliers 71, 72, 73 and a summer 74. The two inputs of each multiplier 71, 72, 73 are fed by the voltages on respective busbars 53, and the outputs of the multipliers are taken to the three inputs of the summer 74. The output of the summer 74 consists, therefore, of a signal whose value is equal to the sum of the squares of the three-phase AC system voltages, and is the signal $V_S$. Under circumstances of perfect balance in the three phases, i.e. equal voltages on all three busbars 53 and exactly 120° between the phases, $V_S$ will be a DC voltage proportional to the AC system voltage.

The sum-of-squares arrangement 70 is common to all three phases, the output of summer 74 being used to supply the input of the combining means 66 not only for phase A, but also for phases B and C, as indicated in FIG. 4. Components 61–69, however, are not common to all three phases, but are triplicated to serve individual phases.

Figure 3:
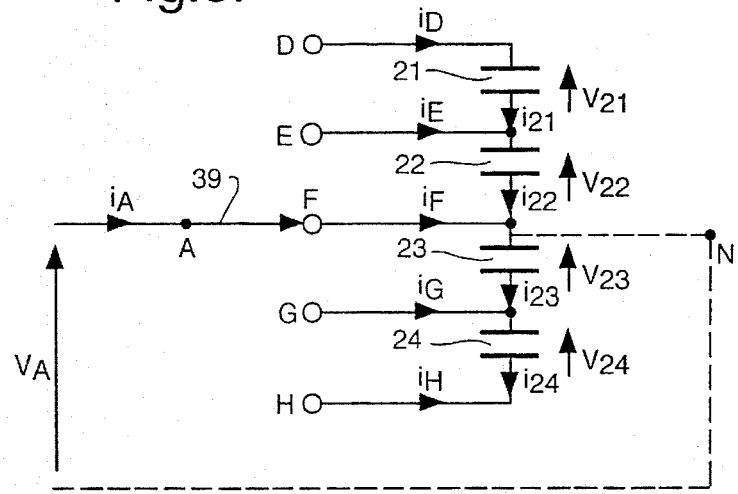
FIG. 3 is an equivalent circuit for one phase of the multilevel convertor.
Figure 5:
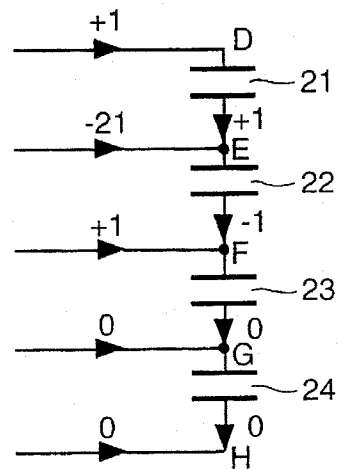
FIG. 5 is a diagram showing the corrections needed to balance the voltages across the capacitors in a convertor according to the invention.

It is now assumed that there is an imbalance in the voltages appearing across two of the capacitors in the set of capacitors 20. Referring to FIG. 3, it is assumed that the voltage across capacitor 21 is too low, and that across capacitor 22 is too high, relative to the correct voltage values. FIG. 5 shows a pattern of currents, additional to the normal currents, fed into nodes D, E and F only, which will tend to correct the voltages across capacitors 21 and 22, while leaving the other capacitor voltages unchanged.

Figure 6:
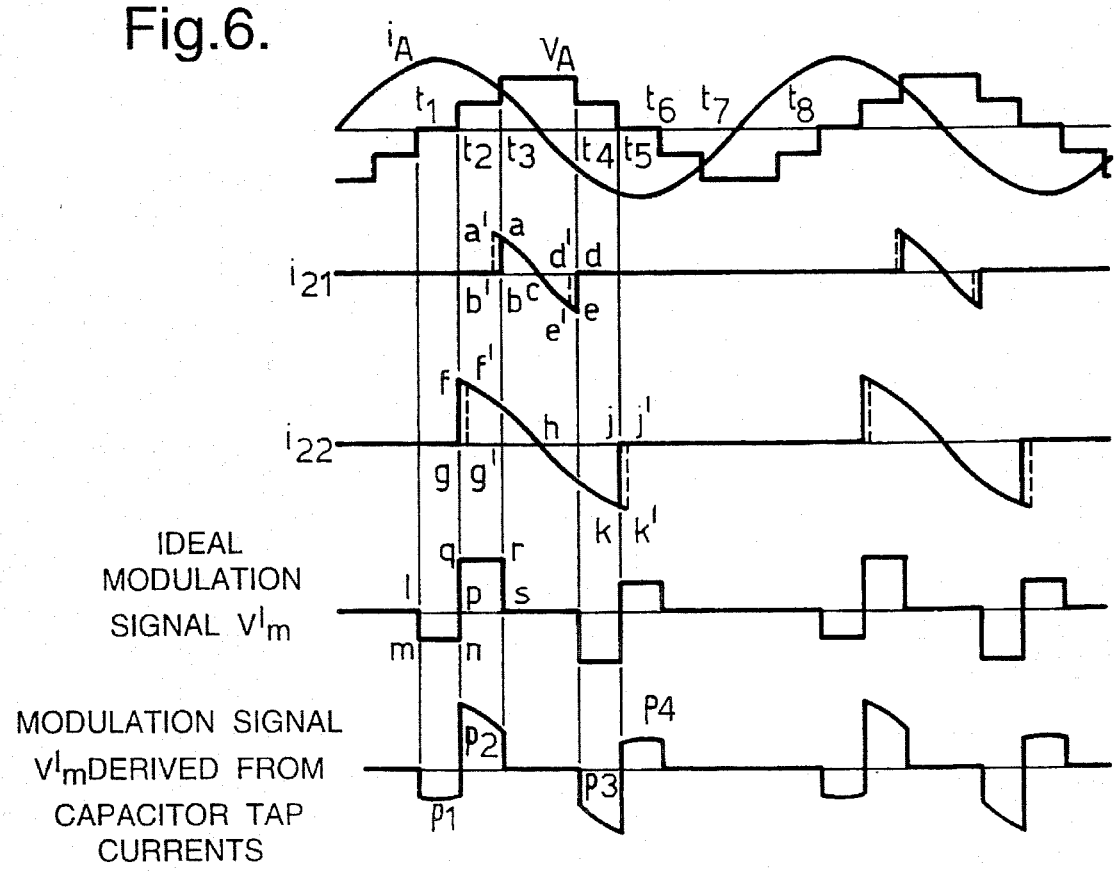
FIG. 6 is a waveform diagram showing the timing adjustments necessary to effect the corrections shown in FIG. 5.

The invention introduces such correcting currents by arranging for the phase voltage point A (see FIG. 1) to be clamped to the voltage on node E later than normal, and to the voltage on node D earlier than normal. This is illustrated in FIG. 6, where times $t_2$ and $t_5$ are seen to be retarded from fg to f'g' and from jk to j'k', respectively, while times $t_3$ and $t_4$ are advanced from ab to a'b' and from de to d'e', respectively. Clearly, in such a situation the areas under the I/t curves, which represent capacitor charge, for capacitors 21 and 22 are given a net positive and a net negative value, respectively, causing the voltages across these capacitors to increase and decrease, respectively. By suitable choice of the amount of the respective time changes, changes of mean charge of such an amount and direction can be induced in capacitors 21 and 22, as required in FIG. 5, that the capacitor voltages $V_{21}$ and $V_{22}$ move towards the correct values, without disturbing the values of the voltages on the other capacitors.

Control of these necessary adjustments is effected by means of the subsidiary control loops now to be described, the main control loop being that formed by the influence of the reference voltage $V_{REF}$, which is present on the input 68 of the difference means 66, on the AC system voltage level, a signal representing which is present on input 67.

Figure 7:
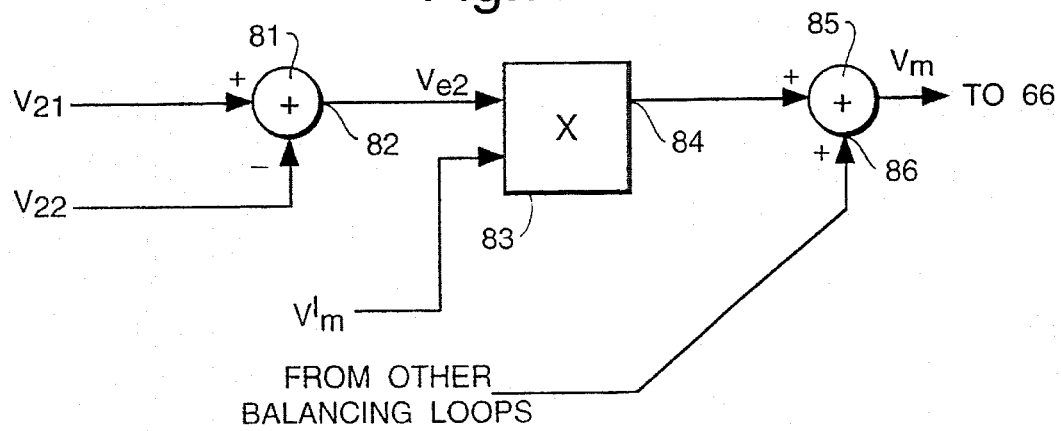
FIG. 7 is diagram showing the application of a modulating signal to the VCO of a control system in a convertor according to the invention.

Part of one such subsidiary control loop is shown in detail in FIG. 7. In FIG. 7, a subtracter 81 receives signals proportional to the voltages across capacitors 21 and 22. It is assumed that these capacitors, and the other capacitors in the capacitor set 20, are of equal capacitance value, and also that it is desired to maintain equal mean voltages across these capacitors, though of course that value of voltage will vary depending on the overall action of the SVC vis-à-vis the AC system.

The output 82 of the subtracter 81 is taken to one input of a second combining means 83, which is a multiplier, the other input being supplied by a signal $V'_m$, to be discussed later. The output 84 of the multiplier 83 is taken to one input of a summer 85, and the output of the summer 85 forms the signal $V_m$ shown entering the input 69 of the difference means 66 in FIG. 4. A second input 86 of the summer 85 is used as the input point for the other subsidiary control loops, to be discussed later.

The signal $V'_m$ is a modulating signal which modulates the timings of the main loop in a sense such as to bring about the desired changes in firing times $t_2$–$t_5$, so as to cause the relative capacitor voltages $V_{21}$ and $V_{22}$ only to move toward equal values as the subsidiary control loop settles towards zero error.

The voltages on the inputs of the subtracter 81 are formed by means of a conventional voltage divider connected across each of the respective capacitors, the divider outputs being then taken to a buffer before being passed on to the subtracter 81.

Figure 1:
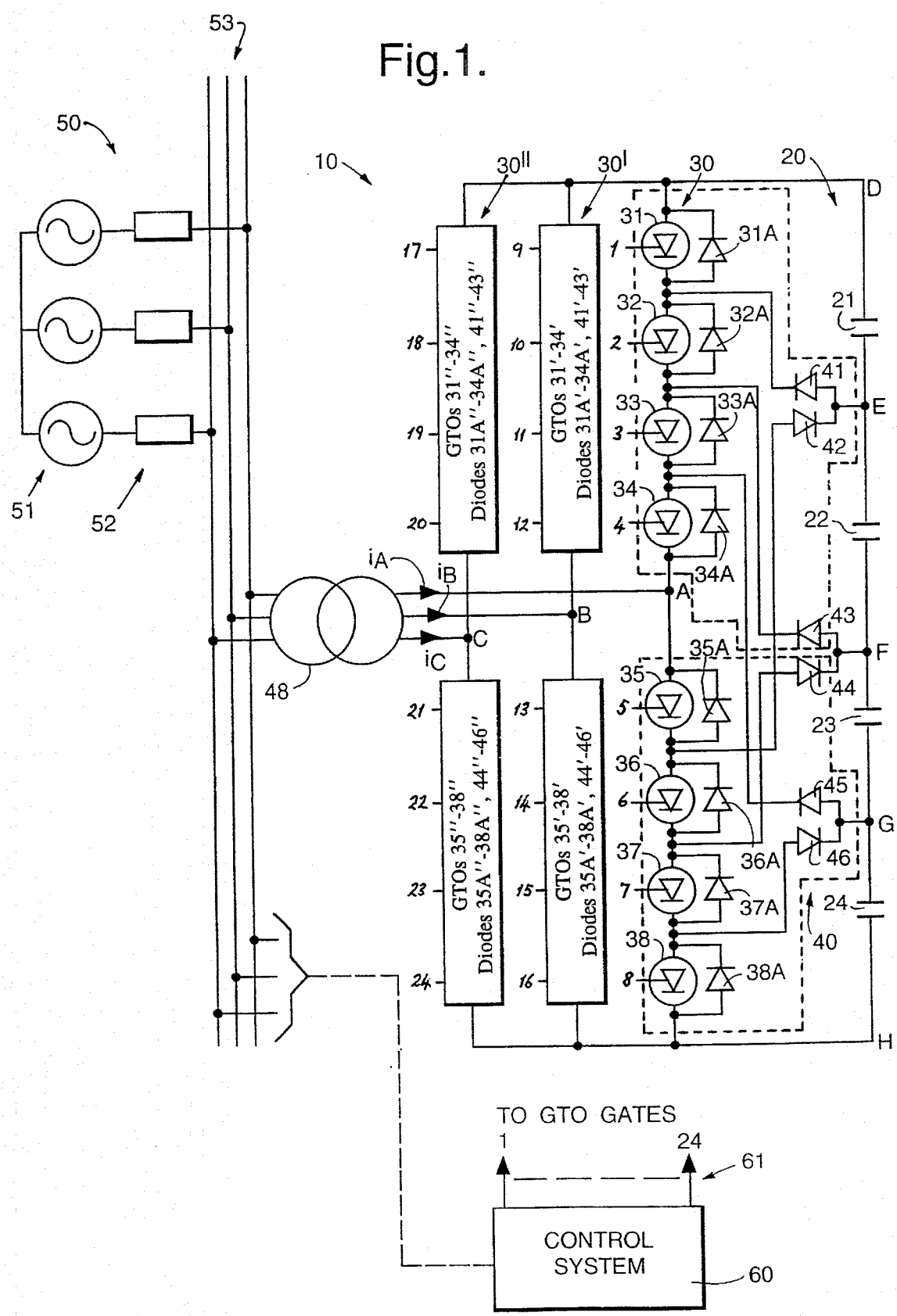
FIG. 1 is a schematic diagram of a multilevel convertor arranged as a static VAr compensator.

It is assumed that the main control system has an integral characteristic, that is, the change of GTO firing time, for example time 12, is an integral function of the error in the main control loop ($V_{e1}$ in FIG. 4) over the previous time segment $t_1$-$t_2$, and similarly for all the other time periods $t_3$ to $t_8$. This is obtained, for example, by the use of an indirectly locked oscillator control system, i.e. one as shown in FIG. 1, in which the VCO phase is locked via the main control loop and includes the entire main circuit and AC system. In such an indirectly locked control system, the deviation of the VCO input voltage $V_{e1}$ from zero tends to cause a proportional change in the frequency of the VCO. For other types of basic control system having a proportional rather than integral characteristic, the same effect can be obtained by adding a substantially integral function (not shown) in the subsidiary loop in the path of signal $V_m$.

A suitable (idealised) form of modulating signal function $V'_m$ is then as shown in FIG. 6, comprising rectangular pulses such as lmnp and pqrs. The changes of timing at the end of each pulse are then proportional to the time-integral of these pulses. Such a fixed amplitude modulating signal can easily be generated using electronic logic components controlled in time from suitable extra outputs from the ROM 63 in FIG. 4. However, this has the drawback that, when the convertor is used, for example, as an SVC, such a fixed modulating signal is suitable only for one condition, e.g. operation in the leading AC current mode (the SVC acting as a capacitive reactive power source). If SVC operation is then required to change to the lagging AC current mode (SVC acting as an inductive reactive power source), it is necessary to reverse the polarity of the modulating signal, otherwise the closed subsidiary control loop will have a positive loop gain and become unstable.

It has been discovered that, if the modulating signal $V'_m$ is derived from a measurement of currents in the relevant capacitor taps due to the particular phase, the above problem vanishes. This is because, when the AC current waveform reverses in the transition from leading current through zero current to lagging current, and vice-versa, due for example to normal changes in the AC system, the polarity of the modulating signal automatically reverses, and consequently the loop gain in the subsidiary loop can be arranged always to be negative, resulting in stable operation.

Figure 2:
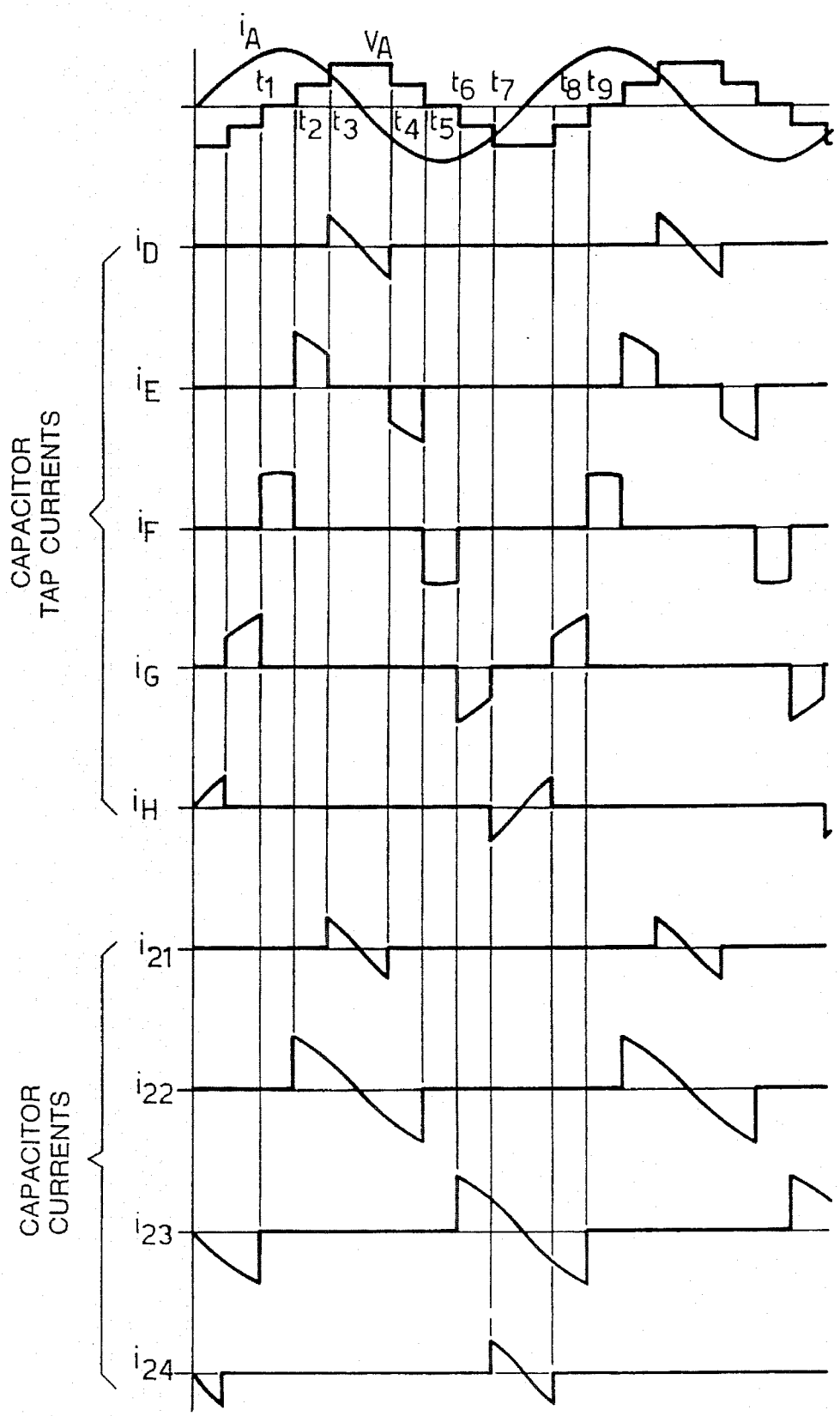
FIG. 2 is a waveform diagram for various voltages and currents within the multilevel convertor shown in FIG. 1.

Such a derived modulating signal $V'_m$ is shown as the lowermost waveform in FIG. 6. In one cycle of fundamental frequency, this waveform comprises four pulses $P_1$, $P_2$, $P_3$ and $P_4$. Pulses $P_1$ and $P_4$ are arranged to be derived from current $i_F$ in capacitor node F, pulses $P_2$ and $P_3$ from current $i_E$ in node E (see FIG. 2), each in suitable proportions.

Figure 8:
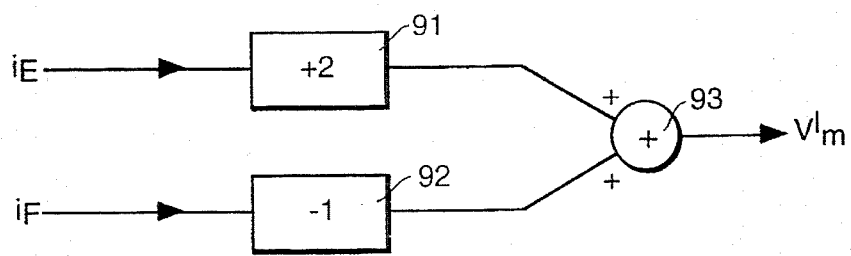
FIG. 8 shows the derivation of the modulation signal of FIG. 7.

FIG. 8 shows how the two signals, $i_E$ and $i_F$, are combined for balancing capacitor voltages $V_{21}$ and $V_{22}$. Signals proportional to tap currents $I_E$ and $i_F$ are given weighting factors of respectively +2 and −1 in weighting means 91 and 92, and are then summed in a summer 93 to form the modulating voltage $V'_m$, which is applied to the multiplier 83 in FIG. 7. The weighting factors are the same as in FIG. 5 for the respective tap currents, i.e. −2I and +I, except for a reversal of sign in each case. The waveform for such a modulating signal differs in detail from the so-called "ideal" modulation signal seen in FIG. 6, but since the main control system is assumed to have an integral response, only the areas underneath the pulses, not the pulse shapes themselves, are relevant.

Figure 9:
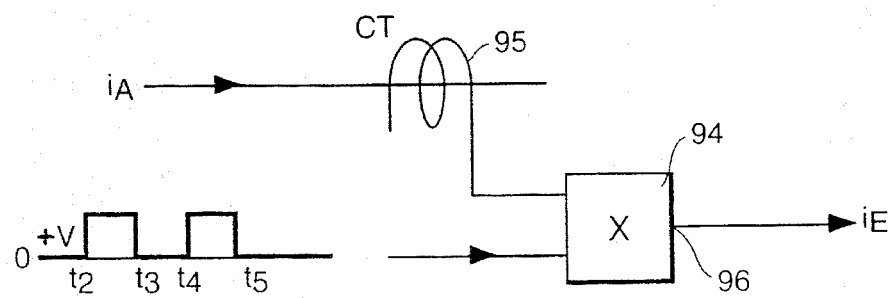
FIG. 9 shows the use of a strobing signal to derive the modulation signal of FIG. 8.

The tap currents are sensed by means of a conventional current transformer. In practice, to avoid having to use one such transformer per capacitor node, only one current transformer is employed situated in the common phase current line, $i_A$ (corresponding current transformers are used also in lines $i_B$ and $i_C$ for the other two phases). Since this phase current consists of all the tap currents successively switched onto node A, the current contributions from tapping points E and F only are derived by a strobing technique. This is shown in FIG. 9, where a multiplier 94 receives on one input a signal proportional to $i_A$ via a current transformer 95 in the main phase line, and on another input a strobing signal, which in practice is derived from the outputs of ROM 63. This strobing signal enables the multiplier 94 only during time segments $t_2$–$t_3$ and $t_4$–$t_5$, allowing the current contribution $i_E$ to pass through to the output 96 of the multiplier 94. A similar arrangement exists for the derivation of current $i_F$; in this case, the corresponding multiplier is enabled by its strobing input during times $t_1$–$t_2$ and $t_5$–$t_6$.

While FIG. 7 shows one subsidiary control loop for balancing the voltages across two of the capacitors in the capacitor set 20, i.e. capacitors 21 and 22, in practice a total of three such loops are required. The other two have their multiplier outputs, corresponding to the output 84 in the subsidiary loop shown, summed in the summer 85, and are arranged to balance the voltages on the pairs of capacitors: 22 and 23; 23 and 24. Thus, in operation all the capacitors in the capacitor set 20 are kept at equal voltages. The other subsidiary loops have their modulation signal $V'_m$ derived from the relevant capacitor tapping points.

In a second embodiment of the invention (not shown), one or more of the subsidiary control loops are arranged to provide unequal capacitor voltages, for example in order to attain a more nearly sinusoidal phase voltage. This is achieved by inserting a weighting means in either or both of the inputs to the subtracter 81. The error voltage $V_{e2}$ will then still settle to zero, but $V_{21}$ and $V_{22}$ (and/or other capacitor voltages in other balancing loops) will be in a relationship determined by the weighting factors.

In a third embodiment of the invention (not shown), the subsidiary control loops are arranged to control the absolute voltage levels on each of the four capacitors separately. This is effected by replacing $V_{22}$ in FIG. 7 by a fixed reference voltage, $V_{21}$ being then controlled to be equal to the reference. By including a weighting factor in the $V_{21}$ input of summer 81, $V_{21}$ can be arranged to assume a particular multiple (or sub-multiple) of the reference. The other capacitors can be controlled in their subsidiary loops from the same reference voltage.

In a further embodiment of the invention (not shown), the reference replacing $V_{22}$ in FIG. 7 (and replacing also the corresponding inputs of the corresponding subtracters in the other subsidiary loops) is made variable and is derived from the error signal in a main control loop. By this means, all capacitor voltages change together in response to a change in the main quantity to be monitored, for example AC busbar voltage. This is a "loop within a loop" arrangement, and as such has the disadvantages of a relatively longer response time and poorer stability performance, though it may be useful in special conditions, e.g. where manual control of voltage level is required.

Whereas the multilevel convertor according to the invention has been described within the context of a static VAr compensator (SVC), it may also be employed to perform other functions. One such is a DC convertor, whereby real power is transferred between an AC and a DC system, as for example in a high-voltage DC system for power transmission. The convertor in general will then also draw controllable reactive power from the AC system.

The simplest implementation (not shown) of this is where a two-terminal DC load or DC source is connected across the outermost nodes (nodes D and H) of the set of capacitors 20 of FIG. 1. Because the respective convertor connections supplying these nodes have net mean DC currents, but the intermediate capacitor tapping points E, F and G do not, it is necessary to allow the "distortion" of either the relative capacitor voltages (which determines the phase voltage levels) or the relative times of firing, or both, relative to the case where all mean currents are zero. The resulting harmonic distortion will then vary according to working conditions; it can, for example, be designed to be a minimum at rated DC current, but will then increase for lower DC currents. The use of subsidiary control circuits according to the invention cannot completely remove this effect, but it can achieve a compromise.

Figure 10:
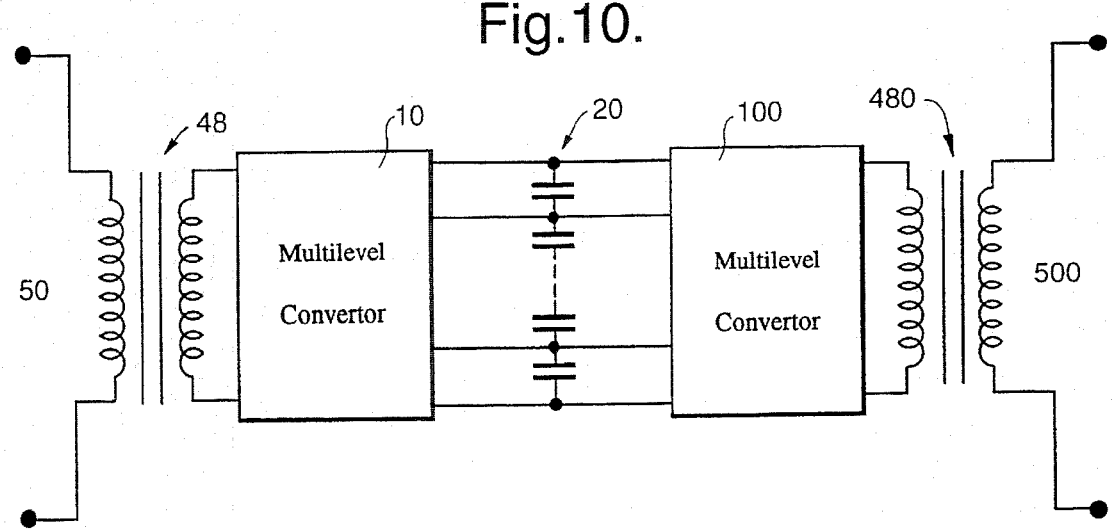
FIG. 10 is a schematic diagram of two convertors according to the invention connected in back-to-back formation between two AC systems.

The convertor according to the invention may also be employed in a "back-to-back" configuration coupling two AC systems (see FIG. 10). In this arrangement, an AC system 50 supplies a transformer 48 connected to a convertor 10 according to the invention, the convertor 10 employing a set of capacitors 20 in common with a second convertor 100. The second convertor 100 is coupled to a second AC system 500 via a second transformer 480. By using subsidiary loops in each convertor according to the invention, the system will settle to a state in which the net DC current at every capacitor node is zero, so that the capacitor levels can be held at relatively ideal values for all practicable real and reactive loading of the two convertors, giving good harmonic performance with safe operation of GTO's and other components. Such a back-to-back arrangement can be used to transfer power between two AC systems independently of their relative phase or frequency—i.e. coupling is "asynchronous". It can be used where one AC "system" is either an AC generator or an AC motor.

Figure 11:
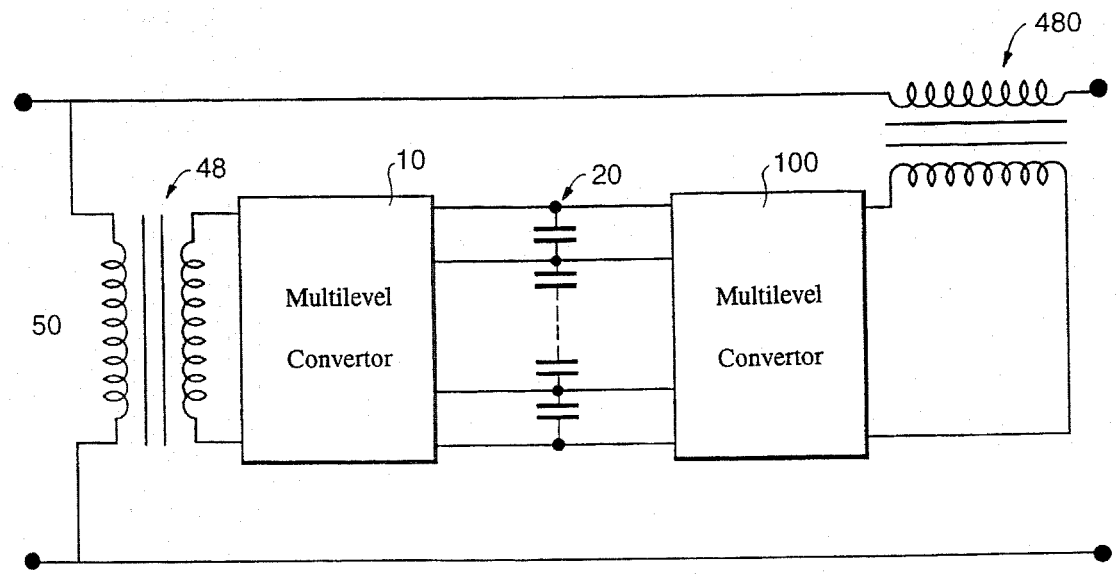
FIG. 11 is a schematic diagram showing the basic back-to-back configuration of FIG. 10 employed as an autotransformer arrangement.

It is possible to employ the convertor according to the invention in an autotransformer arrangement, as shown in FIG. 11. This configuration is basically the same as that of FIG. 10, except that the second transformer 480 has its secondary connected into the load line of the first AC system 50. By the use of appropriate main control loops, the AC voltage at the secondary of the transformer 480 can be arranged to have any phase relative to the input power source 50, and any magnitude up to the convertor rating. The overall configuration, therefore, can be made to operate as a variable-ratio transformer (similar to a transformer with a tap changer) or as a variable phase shifter over a limited range, or as a combination of the two.

In a further aspect of the invention, a number of convertors according to the invention may be connected in parallel onto the AC busbars. Respective GTO's of the convertors may be either switched simultaneously in order to form an SVC of relatively high rating, or may be switched at slightly different times in each case, with different switching patterns such that the net current in the AC system due to all convertors is equivalent to that of a single convertor having a larger number of levels, approximately equal to the sum of the number of levels in each convertor. Where separate sets of DC capacitors are used for each convertor, separate subsidiary control circuits according to the invention may be employed. Alternatively, where a common set of capacitors is used, similar subsidiary control circuits may be provided, but with modulating functions derived from the relevant separate current contributions to each capacitor tap.

The above description of the convertor according to the invention has assumed the use of analogue components, such as operational amplifiers, except in the case of the binary counter and ROM shown in FIG. 4. However, the control system may be implemented by digital means, rather than analogue; this may be by the use of either dedicated or programmable digital electronic components. Where digital means are used to implement the invention, the various signals internal to the control system will exist only as digital numbers in digital registers, such numbers being updated relatively frequently by digital calculations which perform functions in accordance with the principles of the invention.

We claim:

1. A multilevel convertor for connection to a single-phase or multiphase AC system, the convertor comprising:

a plurality of series-connected capacitors, the capacitors being arranged, when the convertor is switched on, to be charged to an initial DC voltage, a plurality of switch means for each phase for connecting each node of the plurality of capacitors in turn onto the AC system, said switch means having respective control inputs, a main control loop arrangement for controlling the timing of the coupling of each node of the plurality of capacitors in turn onto the AC system, the main control loop arrangement including, for each phase:

a switching control means for performing switching operations on said switch means, said switching control means having a control input and a plurality of outputs connected to respective control inputs of said switch means, an error signal producing means for producing an error signal representative of a difference between an actual value of an electrical quantity to be controlled and a reference value of said quantity, an output of said error signal producing means being connected to said control input of said switching control means, a plurality of subsidiary control loops for each phase, said plurality of subsidiary control loops being one fewer in number than said plurality of capacitors and being associated with respective pairs of said capacitors, each subsidiary control loop including a first combining means having a first input for receiving a first signal proportional to a difference between mean DC voltage levels on a pair of capacitors associated with that subsidiary control loop, and a second input for receiving a second signal proportional to tap currents entering a pair of nodes associated with said pair of capacitors, the first combining means having an output which is taken to an input of said error signal producing means such that said output signal of said first combining means is additively combined with said error signal, said subsidiary control loops serving to maintain a predetermined relationship between the mean DC voltage levels on said plurality of capacitors.

2. A multilevel convertor for connection to a single-phase or multiphase AC system, the convertor comprising:

a plurality of series-connected capacitors, the capacitors being arranged, when the convertor is switched on, to be charged to an initial DC voltage, a plurality of switch means for each phase for connecting each node of the plurality of capacitors in turn onto the AC system, said switch means having respective control inputs, a main control loop arrangement for controlling the timing of the coupling of each node of the plurality of capacitors in turn onto the AC system, the main control loop arrangement including, for each phase:

a switching control means for performing switching operations on said switch means, said switching control means having a control input and a plurality of outputs connected to respective control inputs of said switch means, an error signal producing means for producing an error signal representative of a difference between an actual value of an electrical quantity to be controlled and a reference value of said quantity, an output of said error signal producing means being connected to said control input of said switching control means, a plurality of subsidiary control loops for each phase, said plurality of subsidiary control loops being the same in number as said plurality of capacitors and being associated with respective ones of said capacitors, each subsidiary control loop including a first combining means having a first input for receiving a first signal proportional to a difference between a mean DC voltage level on a capacitor associated with that subsidiary control loop and a reference voltage level, and a second input for receiving a second signal proportional to a tap current entering a node associated with said capacitor, the first combining means having an output which is taken to an input of said error signal producing means such that said output signal of said first combining means is additively combined with said error signal, said subsidiary control loops serving to maintain predetermined absolute values of mean DC voltage levels on said plurality of capacitors.

3. The multilevel convertor as claimed in claim 2, in which said second signal proportional to tap currents is derived by way of sensing means for sensing current flowing in the inductance means, the subsidiary control loops including respective strobing means for enabling the current sensed in the sensing means to be passed on to subsequent circuitry as the second signal proportional to tap currents at those times when the current flowing through the inductance means corresponds to the capacitor tap current associated with the respective capacitor.

4. The multilevel convertor as claimed in claim 1 or claim 2, in which the switching control means includes a voltage-controlled oscillator having a control input for receiving said error signal, and a sequencing means fed from an output of the voltage-controlled inputs of said switch means.

5. The multilevel convertor as claimed in claim 1 or claim 2, in which the first combining means is a multiplier.

6. The multilevel convertor as claimed in claim 1, in which each subsidiary control loop includes a second combining means having an output connected to the second input of the first combining means and first and second inputs for receiving first and second signals proportional to respective said tap currents.

7. The multilevel convertor as claimed in claim 6, in which each subsidiary control loop includes a weighting means in one or both of the first and second inputs of the second combining means.

8. The multilevel convertor as claimed in claim 7, in which the second combining means and the weighting means are configured such that, when the convertor is in operation, a signal at the output of the second combining means consists of the difference between one of the first and second signals proportional to tap currents and substantially twice the other of the first and second signals proportional to tap currents.

9. The multilevel convertor as claimed in claim 1, in which said second signal proportional to tap currents is derived by way of sensing means for sensing current flowing in the inductance means, the subsidiary control loops including respective strobing means for enabling the current sensed in the sensing means to be passed on to subsequent circuitry as the second signal proportional to tap currents at those times when the current flowing through the inductance means corresponds to the capacitor tap currents associated with the respective pair of capacitors.

10. The multilevel convertor as claimed in claim 3 or claim 9, in which the sensing means is a current transformer.

11. The multilevel convertor as claimed in claim 4, in which the sequencing means includes a binary counter having a clocking input fed from the output of the voltage-controlled oscillator and a plurality of binary outputs, and a read-only memory having a plurality of address inputs fed from respective binary outputs of the counter, a plurality of storage locations and a plurality of data outputs which are arranged to switch the switching arrangement according to a pattern of data stored in the addressed storage locations.

12. The multilevel convertor as claimed in claim 1 or claim 2, in which the plurality of switch means includes a plurality of series-connected first switch means and a like plurality of series-connected second switch means, the plurality of first switch means being connected in series with the plurality of second switch means across the outermost nodes of the plurality of capacitors, and a plurality of first diodes and a like plurality of second diodes, the plurality of first switch means having tapping points which are connected by means of respective first diodes to respective tapping points of the plurality of capacitors and the plurality of second switch means having tapping points which are connected by means of respective second diodes to the same respective tapping points of the plurality of capacitors, the second diodes being configured in a reverse direction to the first diodes, and the inductance means being constituted by the leakage reactance of a voltage transformer arranged to link the convertor with the AC system.

13. The multilevel convertor as claimed in claim 12, in which the number of capacitors is n, the number of first and second switch means per phase is 2n, the number of first and second diodes per phase is n−1 and the number of voltage levels in the voltage presented to the AC system is n+ 1.

14. The multilevel convertor as claimed in claim 13, in which the transformer is a single-phase transformer, n is an even number, and a secondary winding of the transformer is connected at one end to the junction of the pluralities of first and second switch means and at the other end to the center tap of the plurality of capacitors.

15. The multilevel convertor as claimed in claim 13, in which the transformer is a single-phase transformer and in which is included a plurality of third switch means and a like plurality of fourth switch means, the third and fourth switch means being configured in the same way as the first and second switch means and being connected to the same respective capacitor tapping points by way of respective pluralities of third and fourth diodes, a secondary winding of the transformer being connected at one end to the junction of the pluralities of first and second switch means and at the other end to the junction of the pluralities of third and fourth switch means, the sequencing means being arranged to switch the third and fourth switch means in opposite phase with the first and second switch means.

16. The multilevel convertor as claimed in claim 13, in which the transformer is a three-phase transformer and in which is included a plurality of third switch means and like pluralities of fourth, fifth and sixth switch means, the third and fourth switch means and the fifth and sixth switch means being configured in the same way as the first and second switch means and being connected to the same respective capacitor tapping points by way of respective pluralities of third, fourth, fifth and sixth diodes, the transformer having first, second and third secondary phase windings which are connected to the junction of the pluralities of first and second switch means, the junction of the pluralities of third and fourth switch means and the junction of the pluralities of fifth and sixth switch means respectively, the switching control means being triplicated in order independently to control the switching of the first and second, the third and fourth, and the fifth and sixth switch means.

17. The multilevel convertor as claimed in claim 16, in which the first, second and third secondary phase windings are configured in star or in delta, the line voltage terminals of the star or delta configuration being connected to respective junctions of the pluralities of first and second switch means, the pluralities of third and fourth means and the pluralities of fifth and sixth switch means.

18. The multilevel convertor as claimed in claim 1 or claim 2, in which the switching means are any of: gate-turn-off thyristors, bipolar transistors, field-effect transistors, MOS-controlled thyristors and insulated-gate bipolar transistors.

19. The multilevel convertor as claimed in claim 1 or claim 2, in which the main control loop arrangement is arranged to control any of: the AC system voltage, the current passing through the inductance means and the admittance of the multilevel convertor as seen from the AC system.

20. A static Var compensator comprising the multilevel convertor according to claim 1 or claim 2, the convertor being arranged to draw adjustable leading or lagging reactive power from the AC system.

21. An AC-AC coupling arrangement comprising two multilevel convertors according to claim 1 or claim 2, the convertors being connected back-to-back so that they share a common set of capacitors.

22. A multilevel convertor arrangement comprising a plurality of multilevel convertors according to claim 1 or claim 2, in which the multilevel convertors are configured in parallel for connection to an AC system, the respective switching means of the convertors being arranged to be switched at different times so as to provide the equivalent of a single multilevel convertor having a number of levels approximately equal to the sum of the levels of each individual convertor.

* * * * *